(12) United States Patent
Malone et al.

(10) Patent No.: US 6,241,806 B1
(45) Date of Patent: Jun. 5, 2001

(54) RECOVERING VANADIUM FROM PETROLEUM COKE AS DUST

(75) Inventors: Donald P. Malone, Grayson, KY (US); Thomas C. Holcombe, Neshanic Station, NJ (US)

(73) Assignee: Marathon Ashland Petroleum, LLC, Findlay, OH (US)

( * ) Notice: Subject to any disclaimer, the term of this patent is extended or adjusted under 35 U.S.C. 154(b) by 0 days.

(21) Appl. No.: 09/324,453

(22) Filed: Jun. 2, 1999

Related U.S. Application Data
(60) Provisional application No. 60/088,559, filed on Jun. 9, 1998.

(51) Int. Cl.[7] .............................. C21C 7/00; C22B 34/20
(52) U.S. Cl. .................................. 75/622; 75/331; 75/532; 75/561; 75/961
(58) Field of Search ................................ 75/622, 961, 331, 75/343, 561, 532

(56) References Cited

U.S. PATENT DOCUMENTS

| | | | |
|---|---|---|---|
| 2,467,039 | * 4/1949 | Kerschbaum et al. ................ | 75/622 |
| 3,579,328 | * 5/1971 | Aas et al. ............................... | 75/500 |
| 3,637,370 | * 1/1972 | Buker ..................................... | 75/504 |
| 4,071,355 | 1/1978 | Staggers ................................. | 75/530 |
| 4,203,759 | 5/1980 | Metrailer et al. ...................... | 75/363 |
| 4,243,639 | 1/1981 | Haas et al. ............................. | 423/63 |
| 4,345,990 | 8/1982 | Fahlstrom et al. .................... | 208/404 |
| 4,443,415 | 4/1984 | Oueneau et al. ....................... | 423/68 |
| 4,708,819 | 11/1987 | Vasconcellos et al. ............. | 252/373 |
| 4,816,236 | 3/1989 | Gardner ................................. | 423/65 |
| 4,849,015 | * 7/1989 | Fassbinder ............................ | 75/501 |
| 5,259,864 | 11/1993 | Greenwalt ............................. | 751/445 |
| 5,277,795 | 1/1994 | Thornhill et al. ................. | 208/251 R |
| 5,324,341 | 6/1994 | Nagel et al. .......................... | 75/503 |
| 5,427,603 | 6/1995 | Samant et al. ........................ | 75/622 |
| 5,484,554 | 1/1996 | Vuong et al. ......................... | 252/373 |
| 5,772,726 | * 6/1998 | Woods et al. ........................ | 75/10.22 |

* cited by examiner

Primary Examiner—Roy King
Assistant Examiner—Tima McGuthry-Banks
(74) Attorney, Agent, or Firm—Richard D. Stone

(57) ABSTRACT

A continuous process for recovering vanadium values from petroleum coke is disclosed. A vanadium containing coke is charged to a molten metal bath to which oxygen containing gas is added in an amount sufficient to heat balance the process and produce off gas. The carbon in the coke dissolves in the molten metal bath as does the vanadium content of the coke. A majority, and preferably all, of the net addition of vanadium to the process is removed in the form of "dust" from the molten metal bath.

14 Claims, 2 Drawing Sheets

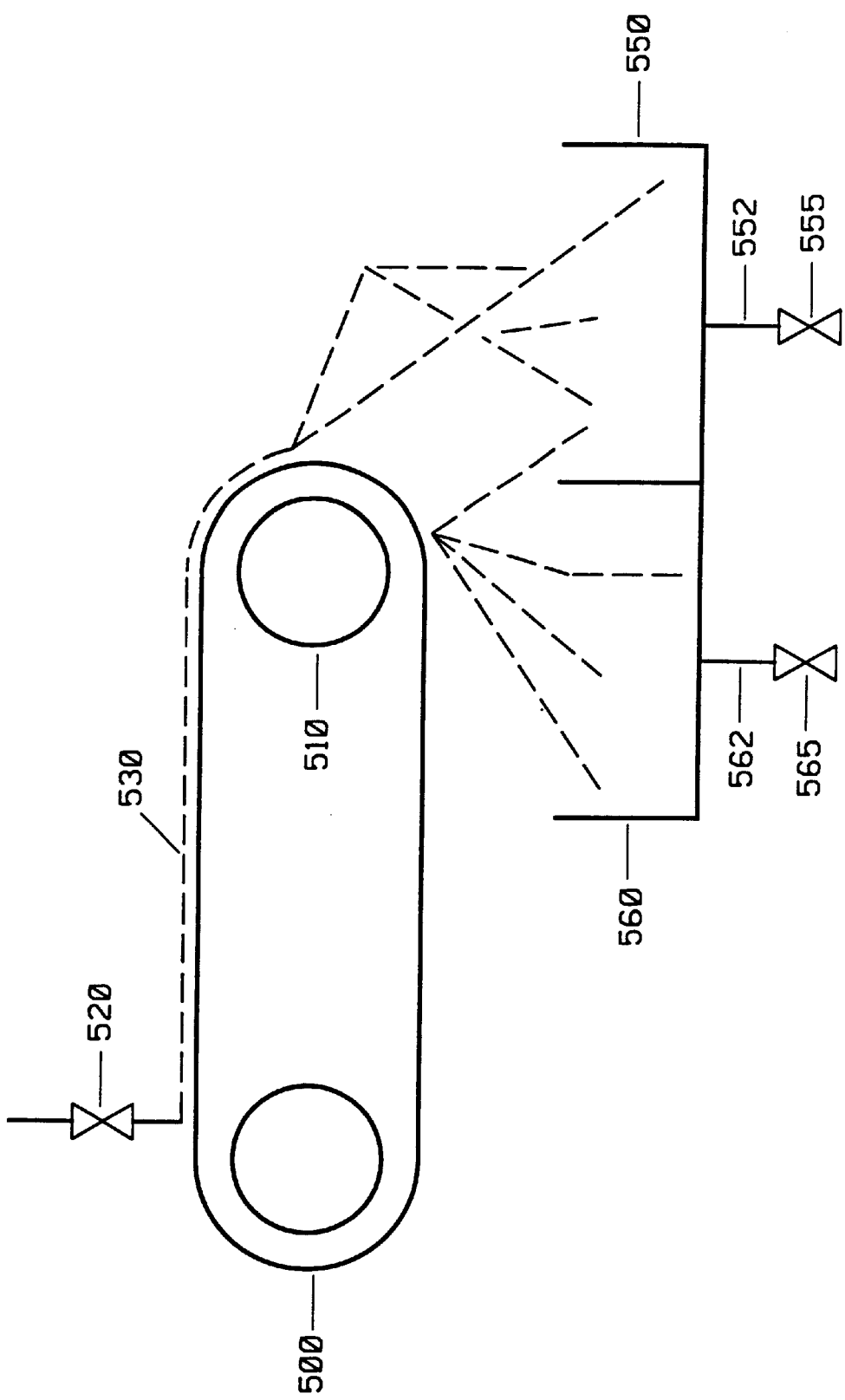

RECOVERING VANADIUM FROM PETROLEUM COKE AS DUST

This application claims priority to provisional application No. 60/088,559 filed Jun. 9, 1998.

Many refiners are now forced to process more difficult stocks, which are heavier and more metals contaminated. Many heavy crudes contain significant amounts of vanadium and sulfur and frequently with lesser amounts of Ni, Fe and other metal compounds.

Such heavy crudes are difficult to process catalytically, so an initial stage of thermal processing, usually some form of coking, is typically used to free distillable, relatively metals free products from vanadium containing coke. The coker gas oil and coker naphtha are essentially free of metals and may be processed by conventional catalytic upgrading processes to produce high quality transportation fuels and other hydrocarbon products. Unfortunately, coking of these difficult crudes produces large amount of coke, a solid product with an enhanced concentration of vanadium and sulfur and other metals present in the charge to the coker.

Many cokers produce coke which is so contaminated with metals and sulfur that it has little value as fuel. The sulfur generally precludes are of coke in cement kilns. Such materials usually have enough vanadium to cause processing problems but too low a vanadium concentration to make vanadium recovery economically attractive.

Some coking processes, such as fluid bed cokers, especially those employing gasifiers, can produce large amounts of fine, low density coke particles which is especially difficult to treat using conventional technology.

To illustrate just how difficult it is to process vanadium rich cokes, some representative prior art processes are reviewed below.

U.S. Pat. No. 4,203,759, Metrailer et al, PROCESS FOR THE PREPARATION OF A VANADIUM-CONTAINING METALLIC ASH CONCENTRATE, taught heating partially gasified coke with oxygen containing gas to produce low density ash. Most ash particles produced had a diameter of less than 1 micron. The fine ash was readily processed with sulfuric acid to recover vanadium.

U.S. Pat. No. 4,243,639, Haas et al, METHOD FOR RECOVERING VANADIUM FROM PETROLEUM COKE, taught gasifying the coke with steam in the presence of an alkali metal salt to improve V recovery during subsequent processing steps.

U.S. Pat. No. 4,345,990, Fahlstrom et al, METHOD FOR RECOVERING OIL AND/OR GAS GROM CARBONACEOUS MATERIALS, taught use of two molten baths to process a variety of carbon containing wastes. A lead or zinc first bath operated at 500 C to thermally devolatilize the carbonaceous material, while the second bath of molten iron operated at 1200 C and operated with oxygen to gasify residual quantities of carbon.

U.S. Pat. No. 4,443,415, Queneau et al, RECOVERY OF V2O5 AND NICKEL VALUES FROM PETROLEUM COKE, taught slurrying coke in an aqueous solution of sodium carbonate to increase V recovery.

U.S. Pat. No. 4,708,819, Vasconcellos et al, REDUCTION OF VANADIUM IN RECYCLE PETROLEUM COKE, taught the problems of high vanadium levels during partial oxidation (the vanadium forms eutectics with refractory walls, melting them). The vanadium content of recycled, unconverted coke was reduced by froth flotation treatment.

U.S. Pat. No. 4,816,236 Gardner, RECOVERY OF VANADIUM AND NICKEL FROM PETROLEUM RESIDUES, taught recovering vanadium from various Flexicoke residues with varying V contents and particle sizes. The patent reported that Flexicoke from the heater bed had 1–5 wt % vanadium pentoxide, while coke from the cyclone venturi fines had 8–12 wt % vanadium pentoxide. Coke from the wet scrubber had as much as 20 wt % vanadium pentoxide. The patentee taught mixing coke with NaOH, burning and then leaching to recover vanadium. A majority of the Ni was reported to be left in the solids after the leach step.

U.S. Pat. No. 5,259,864, Greenwalt, METHOD OF DISPOSING OF ENVIRONMENTALLY UNDESIRABLE MATERIAL AND PROVIDING FUEL FOR AN IRON MAKE PROCESS E.G., PETROLEUM COKE, taught using a sulfur and heavy metal containing petroleum coke in a melter. The coke was mostly burned to form a fluidized bed of coke which was then reacted with ore and oxygen to make molten iron or steel preproducts. A slag layer which contained sulfur was freed during combustion of the petroleum coke.

U.S. Pat. No. 5,277,795, Thornhill et al, PROCESS AND APPARATUS FOR RECOVERING HEAVY METAL FROM CARBONACEOUS MATERIAL, taught burning petroleum coke to produce ash then processing the ash to extract metallic compounds.

U.S. Pat. No. 5,324,341, Nagel et al, METHOD FOR CHEMICALLY REDUCING METALS IN WASTE COMPOSITIONS, taught molten metal processing of metal containing wastes. Multiple reducing agents reduced oxygen-containing metals compounds in a metal-containing waste composition. Claim 24 mentioned use of an oxide of V as an oxidizing agent.

U.S. Pat. No. 5,427,603, Samant et al, METHOD OF TREATING A VANADIUM-CONTAINING RESIDUE, taught processing petroleum coke with air at 850 C in a fluidized bed with an inert bed of granular iron oxide with an oxygen partial pressure between 10-4 bar and 10-6 bar to produce ash. The ash was then processed over a magnetic separator to recover the inert iron oxide for recycle.

U.S. Pat. No. 5,484,554 Vuoung et al, OXIDANT INJECTION FOR IMPROVED CONTROLLED OXIDATION, taught processing of coke in a partial oxidation reactor. The V in the coke forms a V rich slag in the reactor.

While not related directly to processing coke, U.S. Pat. No. 4,071,355, Staggers, RECOVERY OF VANADIUM FROM PIG IRON, taught removal of vanadium from pig iron to produce a vanadium rich slag by oxidizing molten pig iron at 2600–2900 F.

The teachings of these patents, which are incorporated by reference, could be summarized as follows.

Vanadium in petroleum containing coke is difficult to recover directly, that is, from the coke, because it is in a form which does not lend itself to conventional leaching approaches. The carbon, probably present in the form of condensed chelating structures, effectively shields significant portions of the metal from conventional leaching solutions.

Vanadium in coke can be recovered much more readily after combustion, because the vanadium in the ash produced is more susceptible to leaching, though even here some treatment, such as with sodium carbonate or sodium hydroxide was needed to improve metal recovery during leaching.

We wanted to develop a more direct and efficient method of recovering vanadium from petroleum coke.

We discovered that a molten metal process, originally developed to produce high purity hydrogen or synthesis gas from various waste streams, could be modified to process vanadium containing coke and directly recover the metal values as "dust" which could be either vanadium in the metallic state in admixture with iron or oxidized vanadium alone or with iron dust. By recovering most, and preferably all, of the vanadium in the coke as a "dust" product it was possible to make the process truly continuous and simplify the design of the molten metal bath.

Details of the basics or a preferred molten metal process are disclosed in one or more of the following patents, which are incorporated by reference.

U.S. Pat. No. 5,755,839, MOLTEN METAL REACTOR SWING SYSTEM AND PROCESS.

U.S. Pat. No. 5,645,615, MOLTEN DECOMPOSITION APPARATUS AND PROCESS.

U.S. Pat. No. 5,577,346 MULTI-ZONE MOLTEN-METAL HYDROGEN AND FUEL GAS GENERATION PROCESS

U.S. Pat. No. 5,435,814, MOLTEN METAL DECOMPOSITION APPARATUS.

The process defined by the above four patents could tolerate a great many feeds, including coal and trash, but was primarily directed to production of relatively pure hydrogen gas at superatmospheric pressure. This work was not directed toward vanadium recovery from petroleum coke.

The prior art work that was directed to vanadium recovery required too many steps and consumed too much in the way of utilities and reagents. It generally involved burning the coke to form ash, or treating the coke with alkali metal to improve subsequent leaching steps.

We discovered that the best way to recover the V in the coke was to use a special form of molten metal processing to dissolve the carbon and vanadium. The carbon, probably present in the form of a collapsed metalo-porphyrin surrounding an atom of vanadium metal, dissolved readily in the molten iron bath, freeing the vanadium and permitting rapid and complete dissolution of the vanadium metal in the molten iron bath.

The net production of vanadium was then removed from the bath as "dust", which could be either an oxidized form of vanadium or Fe/V metal, depending on the oxidation conditions in the bath.

The process was fast and simple—no special processing of the coke was needed. The process did not require dry coke, but could tolerate and even benefit from the presence of some water in the coke. Heat/utility requirements were low, in fact the worse the feed in terms of % V in the coke, the more heat the process generated per weight of vanadium recovered. The process was tolerant of many other impurities found in coke containing feed, such as Ni and S compounds.

BRIEF SUMMARY OF THE INVENTION

Accordingly, the present invention provides a process for recovering vanadium values from vanadium containing coke and heavy liquid hydrocarbons comprising dissolving V containing coke or heavy liquid hydrocarbon in a molten metal bath, preferably a molten iron bath to produce a molten metal bath containing dissolved carbon and dissolved vanadium metal, exothermically oxidizing at least a portion of said dissolved carbon from said bath to simultaneously generate carbon oxides which are removed as a vapor from said bath and entrain at least a portion of said bath and/or a slag layer on top of said bath as dust and heat said bath to maintain it in a molten condition; thereafter dissolving additional amounts of V containing feed in said bath, and removing from said bath at least a majority of the net addition of V in the form of dust comprising vanadium metal and/or vanadium oxides.

Preferably, a majority of the dust is collected and recycled to the bath during startup until the bath contains at least 10 wt % V, more preferably at least 20 wt % V, and most preferably 40 wt % V, after which recycle is reduced or discontinued as needed to maintain the desired vanadium concentration in said bath and in said dust.

The bath may be continuously or intermittently replenished with fresh iron.

In preferred embodiments, the bath is run at superatmospheric pressure, preferably 2 to 200 atm. High pressure operation allows higher feedstock rates without excessive carryover of dust. Higher pressures also increase the rate at which carbon in feedstock dissolves in the molten metal bath.

Preferably oxygen or other oxygen containing gas, is continuously introduced into the bath to control carbon concentration. When a reducing environment is required, to promote production of vanadium in the elemental metal form, the bath may run with relatively carbon contents, in excess of 2 wt %, or even in excess of 4 wt % and may be at the solubility limit of carbon in the V/Fe bath. The presence of large amounts of carbon dissolved in the molten metal bath ensures strongly reducing conditions which keeps the V in the metallic phase.

When production of oxides of vanadium is preferred, the bath may be run under much more oxidizing conditions so that the vanadium is rapidly oxidized from the molten iron bath.

Presence of large amounts of carbon also permits processing of sulfur rich coke with much or essentially all of the sulfur content released as H2S, which can be readily processed in a refinery Claus unit or other H2S recovery process. If an oxidizing bath is used more of the sulfur will be released as oxides of sulfur which may require sulfur capture with conventional slag forming agents or stack gas processing.

Preferably the molten metal bath operates at least periodically under fairly severe oxidizing conditions so that coke added to the reactor is rapidly dissolved or if not dissolved is oxidized during processing so that the dust which is removed has a low coke and/or soot content.

When desired, multiple zone processing of the coke, alone or admixed with a hydrocarbon, may be practiced to permit recovery of a relatively pure hydrogen stream.

The process is generic as to bath conditions and type. The process could use a molten metal bath of the Molten Metal Technology design, and even could receive ash or V rich coke or V rich heavy hydrocarbons. When desired, the net dust/particulates yield from the molten metal reactor may be magnetically separated - carbon or low metals product recycled and high metal product removed as product.

While a high pressure design, such as that developed by Ashland and disclosed in the above four patents discussed above which were assigned to Ashland, it is also possible to use other molten metal bath designs such as the Molten Metal Technology reactor or other molten bath designs now existing or hereafter developed.

BRIEF DESCRIPTION OF THE DRAWINGS

FIG. 2 is a simplified schematic drawing of a magnetic separation means used to resolve the dust produced into more and less magnetic fractions for recycle or recovery as a product.

Figure 1:
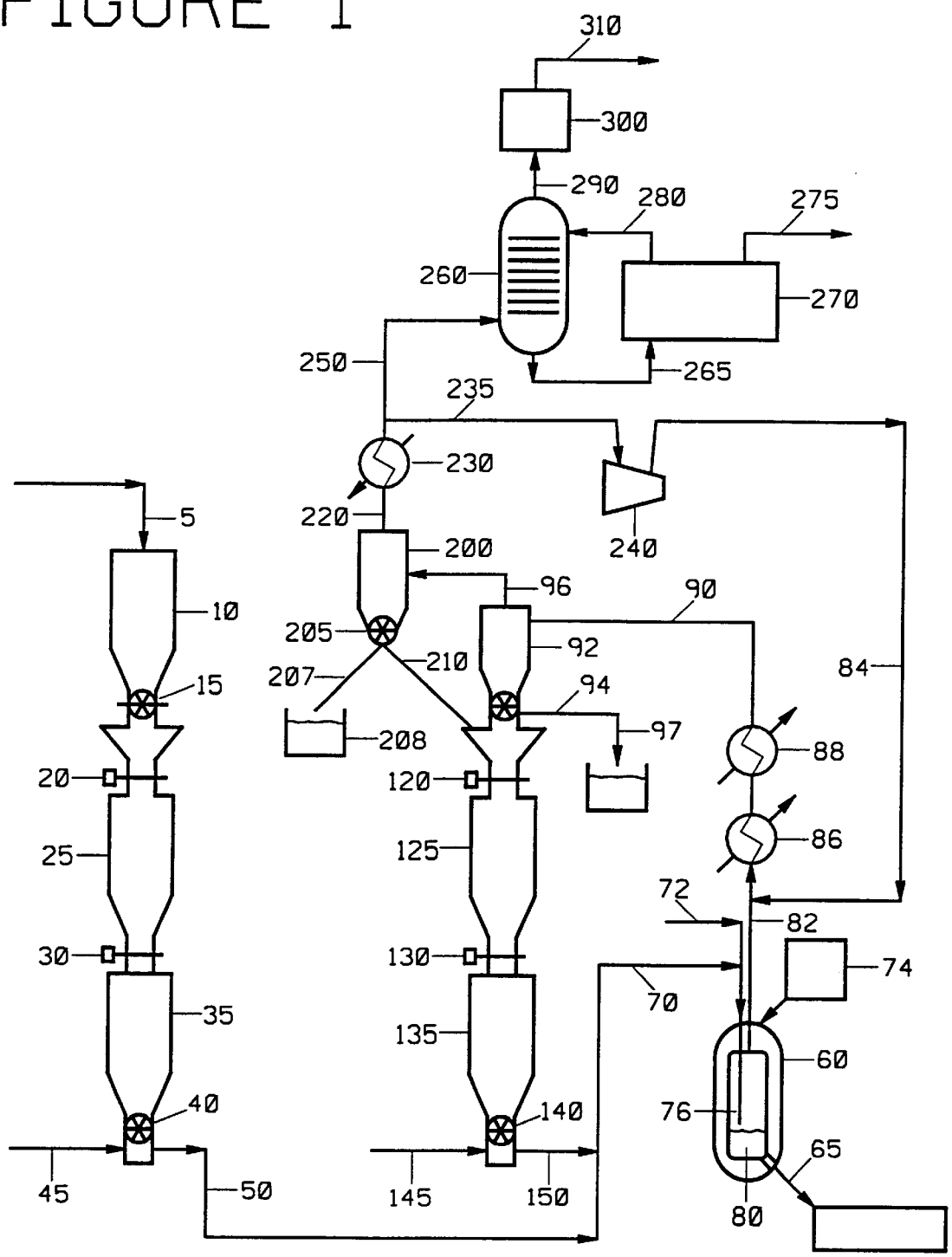
FIG. 1 is a simplified schematic drawing of a preferred embodiment wherein vanadium containing coke is processed in a molten metal reactor to produce vanadium containing dust as the primary vanadium product.

DETAILED DESCRIPTION OF PREFERRED EMBODIMENTS:

The petroleum coke feedstock may be any metal containing coke. Usually the coke will contain vanadium, nickel, and sulfur. Such materials are well known and widely available, they are produced wherever coking is used as an upgrading step for heavy Venezuelan crudes.

The coke may be sponge coke from a delayed coker, shot coke, fines from fluid coker, and the like. Some fluidized coking units partially burn some of the coke, yielding a coke product of enhanced vanadium concentration but generally still classified as coke despite the oxidative treatment.

In addition to coke, the feed may also comprise, or consist essentially of, liquid hydrocarbons. Thus the process may be used to process Venezuelan or other crudes which are contaminated with vanadium, or liquid or semi-solid fractions derived from such crudes.

PROCESS DESCRIPTION

Referring to FIG. 1, a coke feed, typically a fine particulate feed having an average particle size less than 80 microns or even much smaller, is charged via line 5 to feed hopper 10. Coke is discharged via rotary valve 15 through open swing valve 20 into upper hopper 25. Coke is discharged down through swing valve 30 into pressurized hopper 35, from which it is continuously or intermittently discharged via rotary valve 40 into a flowing stream of steam from line 45. Other fluids may be used besides steam, but steam is preferred due to its ready availability and relative safety. The steam/coke mixture flows through line 50, is mixed with a preferred but optional recycle fines stream from line 150, and charged via line 70 into the HyMelt reactor 60. The coke/steam mixture is preferably discharged down via outlet 76 towards molten metal bath 80. Preferably the nozzle is close enough to the surface of metal bath 80 and is discharged with sufficient force to penetrate the metal bath.

Oxygen or oxygen containing gas is preferably co-fed with the coke. This allows a significant amount of preheating of the coke during its passage through the piping to nozzle outlet 76. A stream of iron-vanadium may be continuously or intermittently withdrawn via line 65 as a product of the process, though preferably the process runs continuously with essentially all of the vanadium production being removed in the form of "dust".

Off gas and entrained droplets of iron/vanadium and/or perhaps some slag droplets are removed via line 82, quenched with relatively cool recycle gas from recycle gas line 84 and charged successively through heat exchanger 86 which produces high pressure steam and heat exchanger 88 which produces lower pressure steam. The temperature of the material withdrawn from reactor 60 is typically around 2800 F, while the temperature of the withdrawn vapor is reduced to 1000 F and 350 F respectively by passage through exchangers 86 and 88.

The reactor off gas and entrained solids are charged to cyclone 92 which recovers a low particulates vapor via vapor outlet line 96. A solids rich, dense phase fluidized phase is discharged via rotary valve 94, though the cyclone solids rich phase outlet may be sealed by other conventional means such as a flapper valve or immersion of the cyclone dipleg in a dense phase fluidized bed of particulates. The cyclone vapor phase is charged via line 96 to bag filter 200, which may be a conventional bag house or other gas/particulate separation means such as a third stage separator, electrostatic precipitator, or the like. A solids phase is continuously or intermittently removed via rotary valve 205 and charged via line 210 to admix with the cyclone 92 solids phase and pass via swing valve 120 into hopper 125 and swing valve 130 into recycle fines pressurized hopper 135. Pressurized fines are discharged via rotary valve 140 into flowing steam in line 145 to be recycled, with fresh fluidized coke feed, via line 70 to the HyMelt reactor.

The net addition of V to the molten metal bath is preferably withdrawn as either a coarse dust product from the cyclone separator via line 94 and collection means 98 or as a finer dust product from the bag house via line 207 and collection means 208.

The relatively particulate free vapor withdrawn via line 220 from bag filter means 200 may be further cooled using fin fan coolers, heat exchange with other process streams, or cooling water in cooler 230 to produce cooled vapor. A portion of cooled vapor is charged via line 235 to the inlet of recycle gas compressor 240 which discharges compressed recycle gas via line 84 to serve as quench stream. The remainder of the particulate free vapor is preferably charged through acid gas scrubber 260. Lean solvent in line 280 from solvent regenerator 270 is charged to an upper portion of the scrubber to contact acid gas. A relatively sweet gas stream is withdrawn via line 290 and charged via line 300 into Zno treater 300 or equivalent clean up means to produce a purified gas stream which may be used as fuel or as a hydrogen rich syngas removed via line 310.

The rich solvent, with absorbed acid gas species, is removed via line 265 and recycled to solvent regenerator 270 which preferably recovers at least a portion of absorbed acidic sulfur containing gas species as H2S, which may be converted into elemental sulfur via a conventional Claus unit, not shown.

FIG. 2 shows a preferred method of handling dust produced. The dust is discharged via valve 520 onto a rotating belt 500 passing over magnet 510. Relatively non-magnetic dust particles are thrown from the belt into collector 550 and recycled via line 552 and valve 555 to the molten metal reactor by means not shown. The fraction which is more strongly retained by the magnets stays on the belt long enough to be discharged into collector 560, from which it is withdrawn via line 562 and valve 565 as a product of the process.

Although a rotating belt magnetic separator similar to the MagnaCat process licensed by the MWKellogg Company is preferred, it is also possible to use a drum magnet separator or electromagnets working on particles in a flowing fluid, or by dragging strong magnets through a bin of dust. The essential element is use of some type of magnetic attraction to resolve the dust product into relatively high and low magnetic susceptibility fractions.

In some circumstances, it may be beneficial to use magnetic separation to resolve Fe rich particles from slag and to differentiate both of these from entrained or produced carbonaceous material, either unconverted coke or produced soot.

More details of a preferred magnetic separation process are disclosed in U.S. Pat. Nos. 5,147,527 and U.S. 5,393,412, which are incorporated by reference.

We claim:
1. A process for recovering vanadium as dust comprising dissolving a vanadium and carbon containing coke or heavy hydrocarbon feed in a molten metal bath to produce a molten metal bath containing dissolved carbon and dissolved vanadium metal, introducing into said bath an oxygen containing gas in an amount sufficient to oxidize the net carbon input to said bath and produce heat and a gas stream comprising carbon oxide containing off gas which is removed from said bath; entraining from said bath at least a portion of said bath and/or slag layer on top of said bath as dust containing vanadium in said off gas; cooling said off gas to produce dust particles containing vanadium; regulating the rate of dust particle production so that at least a majority of said vanadium content in said feed is removed as a product of the process in the form of dust.

2. The process of claim 1 wherein the dust contains at least 10 wt % vanadium on an elemental metal basis.

3. The process of claim 2 wherein the dust contains at least 20 wt % vanadium.

4. The process of claim 3 wherein the dust contains at least 40 wt % vanadium.

5. The process of claim 1 wherein at least a majority of the V in the dust is in the from of elemental metal mixed with iron metal.

6. The process of claim 1 wherein the bath is run at superatmospheric pressure and the pressure of the bath is controlled to regulate the amount of dust formation.

7. The process of claim 1 wherein oxygen or other oxygen containing gas, is continuously introduced into the bath to produce CO and control carbon concentration.

8. The process of claim 1 wherein dust particle production occurs due to the addition of oxygen containing gas to the bath.

9. The process of claim 1 wherein dust particle production occurs due to the addition of steam, hydrocarbon or other gas to the bath.

10. The process of claim 1 wherein the dust is recovered by at least one of cyclonic separation or filtration and wherein a portion of said recovered dust is recycled to the bath.

11. The process of claim 1 wherein at least a portion of the dust is magnetically separated into at least a high and a low magnetic susceptibility fraction and at least a portion of said high magnetic susceptibility fraction is recovered as a product and at least a portion of said low magnetic susceptibility fraction is recycled to said bath.

12. The process of claim 1 wherein said molten metal bath is a molten iron bath.

13. The process of claim 1 wherein essentially all of said vanadium content in said feed is removed as a product of the process in the form of dust.

14. The process of claim 6 wherein said pressure is 2 to 200 atm, absolute.

* * * * *